(12) United States Patent
Xu et al.

(10) Patent No.: US 9,671,926 B2
(45) Date of Patent: Jun. 6, 2017

(54) METHOD AND TERMINAL DEVICE FOR DISPLAYING DYNAMIC ICON

(71) Applicant: Xiaomi Inc., Beijing (CN)

(72) Inventors: Ruijun Xu, Beijing (CN); Peng Sun, Beijing (CN); Xinyu Liu, Beijing (CN)

(73) Assignee: XIAOMI INC., Haidian District, Beijing (CN)

(*) Notice: Subject to any disclaimer, the term of this patent is extended or adjusted under 35 U.S.C. 154(b) by 150 days.

(21) Appl. No.: 14/141,487

(22) Filed: Dec. 27, 2013

(65) Prior Publication Data
US 2014/0245227 A1 Aug. 28, 2014

Related U.S. Application Data

(63) Continuation-in-part of application No. PCT/CN2013/083478, filed on Sep. 13, 2013.

(30) Foreign Application Priority Data

Feb. 22, 2013 (CN) .......................... 2013 1 0057402

(51) Int. Cl.
*G06F 3/0481* (2013.01)
*G06F 11/30* (2006.01)
*G06F 11/32* (2006.01)

(52) U.S. Cl.
CPC ...... *G06F 3/04817* (2013.01); *G06F 11/3058* (2013.01); *G06F 11/3065* (2013.01); *G06F 11/32* (2013.01); *G06F 11/324* (2013.01)

(58) Field of Classification Search
CPC .. G06F 3/04817; G06F 11/30; G06F 11/3058; G06F 11/3065; G06F 11/324; H04M 1/7258
See application file for complete search history.

(56) References Cited

U.S. PATENT DOCUMENTS

2002/0111177 A1 8/2002 Castres et al.
2005/0193340 A1 9/2005 Amburgey et al.
(Continued)

FOREIGN PATENT DOCUMENTS

CN 1371232 A 9/2002
CN 1610391 A 4/2005
(Continued)

OTHER PUBLICATIONS

"International Search Report for PCT/CN2013/083478".

*Primary Examiner* — Nicholas Ulrich
(74) *Attorney, Agent, or Firm* — Jun He Law Offices P.C.; James J. Zhu

(57) ABSTRACT

The present disclosure relates to a method and device for displaying a dynamic icon. The method comprises: detecting an icon display instruction; obtaining a dynamic icon resource pack corresponding to an icon to be displayed based on the icon display instruction; analyzing the dynamic icon resource pack to obtain an icon resource information and a dynamic description information; generating a dynamic icon based on the icon resource information and the dynamic description information; and displaying the dynamic icon. The method and device for displaying the dynamic icon provided by the present disclosure may generate the dynamic icon corresponding to each application program based on the dynamic icon resource pack provided by the application program, so that the icon has a dynamic effect.

11 Claims, 8 Drawing Sheets

(56) References Cited

U.S. PATENT DOCUMENTS

| | | | | |
|---|---|---|---|---|
| 2009/0259691 | A1* | 10/2009 | Tanskanen | G06F 1/3228 |
| 2009/0319947 | A1* | 12/2009 | Wang et al. | 715/810 |
| 2010/0138295 | A1* | 6/2010 | Caron et al. | 705/14.49 |
| 2010/0179991 | A1 | 7/2010 | Lorch et al. | |
| 2010/0281121 | A1 | 11/2010 | Cheng et al. | |
| 2010/0325533 | A1* | 12/2010 | Artz | 715/235 |
| 2010/0329642 | A1 | 12/2010 | Kam et al. | |
| 2011/0225547 | A1* | 9/2011 | Fong et al. | 715/835 |
| 2012/0117492 | A1* | 5/2012 | Aggarwal et al. | 715/760 |
| 2012/0167008 | A1* | 6/2012 | Zaman et al. | 715/814 |
| 2012/0260215 | A1* | 10/2012 | Fennel | 715/825 |
| 2013/0014006 | A1* | 1/2013 | Abellera et al. | 715/234 |
| 2013/0138723 | A1* | 5/2013 | Ku et al. | 709/203 |

FOREIGN PATENT DOCUMENTS

| | | |
|---|---|---|
| CN | 1624683 A | 6/2005 |
| CN | 103135987 A | 6/2013 |
| JP | 2007219830 A | 8/2007 |
| JP | 2008522516 A | 8/2008 |
| JP | 2012058900 A | 3/2012 |
| JP | 2012113600 A | 6/2012 |
| RU | 2409833 C2 | 1/2011 |
| WO | 2013/022849 A1 | 2/2013 |

\* cited by examiner

METHOD AND TERMINAL DEVICE FOR DISPLAYING DYNAMIC ICON

CROSS-REFERENCE TO RELATED APPLICATIONS

This application is a Continuation-In-Part of International Application PCT/CN2013/083478, with an international filing date of Sep. 13, 2013, which claims the priority to Chinese Patent Application No. 201310057402.0, filed on Feb. 22, 2013, the entire contents of all of which are incorporated herein by reference.

TECHNICAL FIELD

The present disclosure generally relates to electronic terminal devices, and more particularly, to a method and a terminal device for displaying a dynamic icon.

BACKGROUND

Icons play an extremely important role in the visual of an operating system of computers. The icons may represent a document, a program, a web page, or a command. Besides, it is possible to execute a command, open a certain type of document, or operate a certain type of application with the use of icons. As an access for initiating an application program in the operating system, the icons are convenience and efficient. Generally, the application program corresponding to an icon may be executed only by clicking or double clicking the icon.

The sizes of icons required by different operating systems are different from each other. In order to facilitate a user's identification, the same picture is often used as an icon of the same application program for a long time. Generally, the icons are static pictures with fixed resolutions and without multi-media effects.

SUMMARY

The present disclosure provides a method and a terminal device for displaying a dynamic icon, which is capable of generating icons with dynamic effects.

In one aspect, the present disclosure provides a method for displaying a dynamic icon, which method comprises: detecting an icon display instruction; obtaining a dynamic icon resource pack corresponding to an icon to be displayed based on the icon display instruction; analyzing the dynamic icon resource pack to obtain icon resource information and dynamic description information; generating a dynamic icon based on the icon resource information and the dynamic description information; and displaying the dynamic icon.

In another aspect, the present disclosure further provides a terminal device for displaying a dynamic icon, comprising: a processor; and a memory for storing instructions executable by the processor; wherein the processor is configured to execute steps comprising: detecting an icon display instruction; obtaining a dynamic icon resource pack corresponding to an icon to be displayed based on the icon display instruction; analyzing the dynamic icon resource pack to obtain icon resource information and dynamic description information; generating a dynamic icon based on the icon resource information and the dynamic description information; and displaying the dynamic icon.

In another aspect, the present disclosure further provides a non-transitory computer readable storage medium including instructions, executable by a processor in a terminal device, for performing a method comprising: obtaining a dynamic icon resource pack corresponding to an icon to be displayed based on the icon display instruction; analyzing the dynamic icon resource pack to obtain icon resource information and dynamic description information; generating a dynamic icon based on the icon resource information and the dynamic description information; and displaying the dynamic icon.

In the method and terminal device for displaying the dynamic icon of the present disclosure, it is possible to generate the dynamic icon corresponding to each application program based on the dynamic icon resource pack provided by the application program, so that the icon has a dynamic effect.

It should be noted that the above general description and the following detailed description are for exemplary purpose only, and not intended to limit the scope of the present disclosure.

BRIEF DESCRIPTION OF THE DRAWINGS

The accompanying drawings illustrated herein only serve to enable further understanding of the present disclosure. These drawings constitute a part of the present application, but do not limit the scope of the present disclosure.

Figure 1:
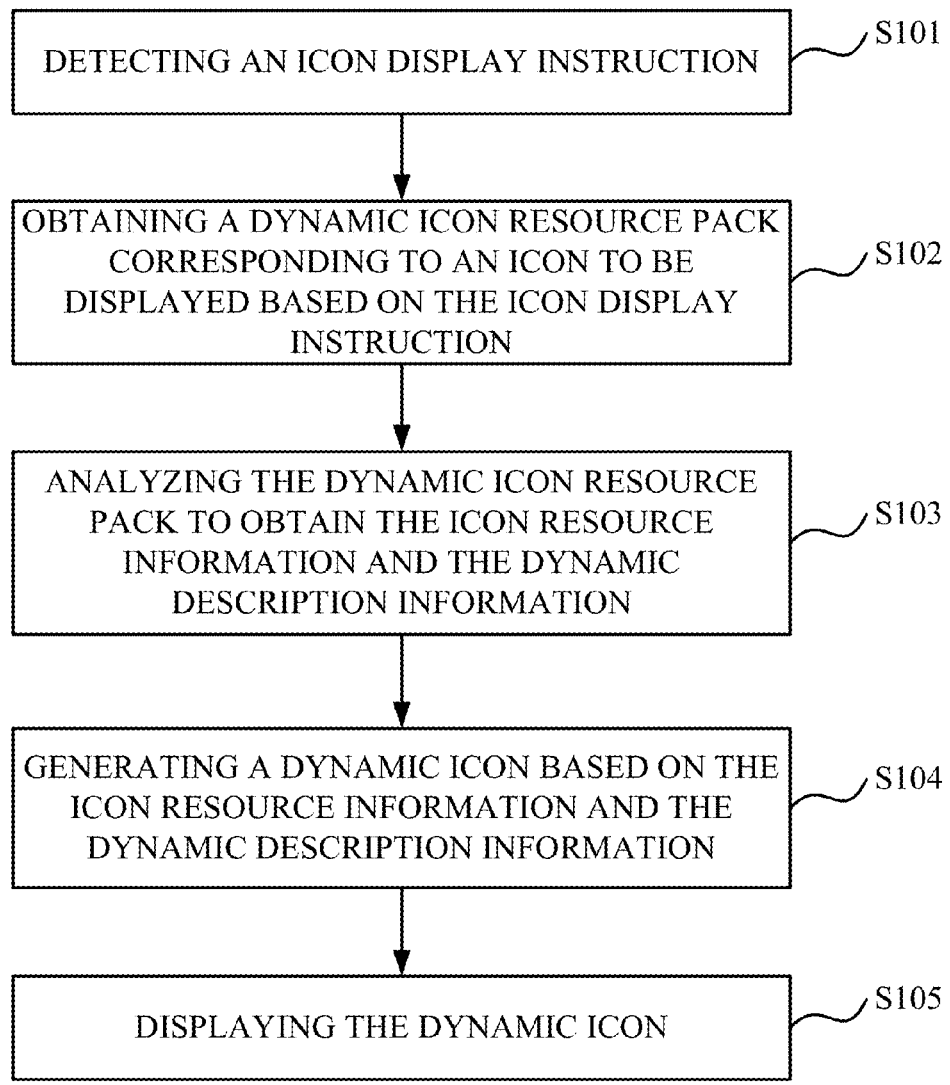
FIG. 1 is an illustrative flow chart of a method for displaying a dynamic icon provided by an embodiment of the present disclosure.

The specific embodiments of the present disclosure have been illustrated by the above drawings, and more detailed description will be given hereinafter. These drawings and literal description do not intend to limit the scope of the ideas of the present disclosure in any way, but to explain the concept of the present disclosure to the person skilled in the art by referring to the specific embodiments.

DETAILED DESCRIPTION OF THE EMBODIMENTS

To make the concept, technical solution and advantage of the present disclosure more apparent, the present disclosure will be described in detail hereinafter with reference to the embodiments and the accompanying drawings. Herein, the exemplary embodiments based on the present disclosure and the description thereof are intended to interpret the present disclosure, but not to limit the present disclosure.

In the embodiments of the present disclosure, there is provided a method and terminal device for displaying a dynamic icon which will be described in detail hereinafter with reference to the accompanying drawings.

According to the present disclosure, the terminal device for displaying a dynamic icon may be implemented using a variety of different types of electronic devices. Examples of such electronic devices may include mobile phones, computers, pads, digital broadcast terminals, messaging devices, gaming consoles, tablets, medical devices, exercise equipment, personal digital assistants, and the like.

The terminal device includes one or more processors to receive various data, programs and instructions, and to process such data, programs and instructions accordingly. The terminal device also includes a memory which is coupled to the one or more processors and is configured to store the data, programs and instructions to be processed by the processors. Furthermore, the terminal device may further include input modules, such as a touch screen, a keyboard, a mouse or the like. These are not described in details as they would be readily apparent to those skilled in the art.

The terminal device may be provided with an operating system to implement data or instruction processing. The operating system may further include a user interface where interaction between a user and the terminal device occurs. The user interface allows the user to manipulate the operating system of the terminal device via user inputs, and allows the operating system to indicate the effects or reactions of the user's manipulation. The terminal device may be also installed with at least one applications/application programs, including without limitation, a browser application, a photo gallery application, an alarm application, an email application, a camera application, an instant messaging application, a music player application, etc. For each applications/application programs, an icon is displayed in the home screen to represent the corresponding applications/application programs. The term "icon" used herein refers to a shortcut or visual representation of the application program or data document in the user interface.

In the following description, the method for displaying a dynamic icon in the terminal device in accordance with some embodiments of the present disclosure is explained. While the process flow described below includes a plurality of steps that appear to occur in a specific order, it should be apparent that those procedures may include either fewer or more operations, which may be executed serially or in parallel.

FIG. 1 is a flow chart of a method for displaying a dynamic icon provided by an embodiment of the present disclosure. As shown in FIG. 1, the method for displaying a dynamic icon includes the following steps.

S101 provides detecting an icon display instruction.

For example, the terminal device may detect an icon display instruction inputted by a user. The icon display instruction may be an instruction to display icons in a home screen interface. For example, once the user unlocks a screen, the terminal device will generally display a home screen interface with a plurality of icons, and in this case, the instruction to unlock the screen inputted by the user is an icon display instruction. When the user inputs an instruction to exit an application program or close a current application program during execution of a certain application program, the terminal device will return to a home screen interface with a plurality of icons, and in this case, the instruction to exit the application program or close the current application program which is inputted by the user is also an icon display instruction.

Alternatively, the terminal device may detect an icon display instruction generated by the operating system. In an exemplary embodiment, once a multimedia player application finishes the playing of some multimedia contents, the operation system will automatically return to a home screen with a plurality of icons. In this case, the instruction to return to the home screen generated by the operating system is also an icon display instruction.

In other embodiments of the present disclosure, icons may be displayed on an interface of the operating system, such as a home screen interface. In addition, after execution of a certain application program, one or more icons may also be displayed on an interface provided by this application program. In this case, the instruction to execute the application program is also an icon display instruction.

S102 provides obtaining a dynamic icon resource pack corresponding to an icon to be displayed based on the icon display instruction.

In an embodiment of the present disclosure, after detecting the icon display instruction, the terminal device displays a corresponding icon. Upon detecting an instruction for displaying the home screen interface inputted by the user, the terminal device is required to display a home screen background and a plurality of icons on the home screen interface. In this case, the terminal device is required to obtain dynamic icon resource packs of all the icons to be displayed.

In an embodiment of the present disclosure, before obtaining the dynamic icon resource packs corresponding to all of the icons to be displayed, the terminal device may firstly determine whether the dynamic icon resource packs corresponding to each icon to be displayed have been stored in the terminal device. If the dynamic icon resource pack corresponding to the icon to be displayed have been stored in the terminal device, the terminal device obtains the dynamic icon resource pack corresponding to the icon to be displayed, and proceed to the subsequent step(s) based on the dynamic icon resource pack to generate a dynamic icon; and if there is no corresponding dynamic icon resource pack corresponding to the icon to be displayed, the terminal device directly obtains and displays a static icon corresponding to the icon to be displayed.

In an embodiment of the present disclosure, the format of the dynamic icon resource pack may be defined in advance, which at least includes icon resource information and dynamic description information.

In an exemplary embodiment, the format of the dynamic icon resource pack may be defined by many programming languages, including Extensible Markup Language (XML).

By way of non-limiting example only, the XML code for defining the dynamic icon resource pack for a weather forecast icon is as follows:

```
<Group>
    <!--weather.bg-->
    <Var name="is_rain" expression="ge(#weather_id,4)*le(#weather_id,11)" />
    <Var name="is_snow" expression="ge(#weather_id,12)*le(#weather_id,17)" />
    <Var name="is_dust"
    expression="ge(#weather_id,18)*le(#weather_id,21)+ge(#weather_id,23)*le(#weather_id,24)" />
```

```
<Var name="icon_suffix"
expression="ifelse(isnull(#weather_id),1,gt(#weather_id,24),1,#weather_id)" />
<Var name="icon_index"
expression="ifelse(#is_rain,4,#is_snow,12,#is_dust,18,#icon_suffix)" />
<Image x="68" y="68" align="center" alignV="center" srcExp="'weather_'+
#icon_index + '.png'" />
<!--temperature-->
<Var name="is_negative"
expression="lt(ifelse(isnull(#weather_temperature),0,#weather_temperature),0)"
/>
<Var name="num_temp" expression="len(abs(#weather_temperature))" />
<Var name="temperature_not_null"
expression="#hasweather*not(eq(len(ifelse(isnull(@weather_temperature_str),'',
@weather_temperature_str)),0))" type="int" />
<Var name="offset_img_y" expression="50" />
<Var name="offset_imag1" expression="ifelse(eq(#num_temp,2),68+11,68)" />
<Var name="offset_imag2"
expression="ifelse(eq(#num_temp,2),68-11,#offset_imag1)" />
<Var name="offset_negative" expression="#offset_imag2-12" />
<Image name="img1" visibility="#temperature_not_null" x="#offset_imag1"
y="#offset_img_y" align="center" alignV="center"
srcExp="'digit(abs(#weather_temperature),1)+'.png'" />
<Image name="img2" visibility="eq(#num_temp,2)" x="#offset_imag2"
y="#offset_img_y" align="center" alignV="center"
srcExp="'digit(abs(#weather_temperature),2)+'.png'" />
<Image visibility="#is_negative" x="#offset_negative" y="#offset_img_y"
align="right" alignV="center" src="negative.png" />
<Image visibility="#temperature_not_null" x="#offset_imag1+13"
y="#offset_img_y" alignV="center" src="degree.png" />
</Group>
```

According to some embodiments of the present disclosure, a software provider of the application or a terminal device manufacturer may define at least one dynamic icon resource pack for one type of icon, wherein each of the at least one dynamic icon resource pack may not only include different icon description information but also include different icon resource information. In other word, at least one dynamic icon resource pack is available for one type of icon in the terminal device and each of the at least one dynamic icon resource pack includes different icon resource information.

S103 provides analyzing the dynamic icon resource pack to obtain the icon resource information and the dynamic description information.

In an embodiment of the present disclosure, after obtaining the dynamic icon resource pack corresponding to the icon to be displayed, the terminal device analyzes the dynamic icon resource pack to obtain the icon resource information and the dynamic description information. The dynamic icon resource pack may be provided by the developer or provider of the application program or a terminal device manufacturer, and when the user installs the application program, the dynamic icon resource pack of the application program is stored in the terminal device at the same time. Moreover, the dynamic icon resource pack of the application may be upgraded or changed by the user or the operating system. For example, the user may download another dynamic icon resource pack of the same application from Internet and substitute the stored dynamic icon resource pack with the newly downloaded dynamic icon resource pack.

In an embodiment of the present disclosure, the icon resource information refers to various resource files (a picture file, a text file, and the like) and the location information thereof, which are necessary for displaying the icon. The dynamic description information describes display content and display effect of the icon resource information (picture, text, and the like) by using a custom format, for example, displays a picture, an animation, a text at a certain position, obtains application program information (e.g., date time, weather information) from the system, or obtains sensor data (e.g., compass) from the system. In an embodiment of the present disclosure, the dynamic icon resource pack does not include animation file(s) or video file(s) generated in advance.

S104 provides generating a dynamic icon based on the icon resource information and the dynamic description information.

In an embodiment of the present disclosure, the terminal device does not store the animation file or video file of the dynamic icon in advance, but generates the dynamic icon based on the analyzed icon resource information and dynamic description information in real time.

In an embodiment of the present disclosure, the dynamic description information may further include refresh rate information of the dynamic icon. In step S103, the terminal device may obtain the refresh rate information of the dynamic icon from the dynamic description information while obtaining the icon resource information and the dynamic description information by analyzing the dynamic icon resource pack. Then, the terminal device determines the refresh rate to generate the dynamic icon based on the refresh rate information of the dynamic icon.

In an embodiment of the present disclosure, icon data information of the dynamic icon may include a variety of information, such as system status information, sensor data information, and application program status information. The terminal device may obtain such icon data information based on the dynamic description information, and process the icon resource information and the icon data information based on the dynamic description information to generate a dynamic icon. In this way, the dynamic icon may not only have a dynamic effect, but also display various icon data information like current system status information, sensor data information and application program status information by utilizing the dynamic effect. Herein, the system status information may include electricity quantity information, time information, signal strength information, and the like of the current terminal device. The sensor data information may include geographical position information, direction information, angular velocity information, acceleration information, and the like of the current terminal device. The application program status information may include notification information of the application program, network notification information, and the like.

As for a calendar icon, the icon data information obtained by the terminal device may include Gregorian calendar information and lunar calendar information, and the icon refresh rate may be set to 1 frame per second. Moreover the dynamic description information may be defined as the dynamic icon alternately displaying Gregorian calendar and lunar calendar. In this way, the terminal device finally generates an effect of the dynamic icon such that the Gregorian calendar and the lunar calendar are alternately displayed every second. In other embodiments of the present disclosure, the icon data information may further include holiday information and lunar solar term information, and the final generated dynamic icon may also display holiday information and lunar solar term information alternately.

As for a compass icon, the icon data information obtained by the terminal device may include sensor data information, and the icon refresh rate may be set to 10 or 20 frames per second. Moreover the dynamic description information may be defined as the compass icon displaying direction needles in real time. In this way, the user may directly know the current cardinal direction without executing the compass function.

As for a weather forecast icon, the icon data information obtained by the terminal device may include weather forecast information sent from a network, the weather forecast information may include temperature information, humidity information, and the like, the icon refresh rate may be set to 1 frame per 5 seconds, and the dynamic description information may be defined as the weather forecast icon displaying an image background which indicates the current weather with alternately displaying information like current temperature and current humidity.

As for a dial icon, the icon data information obtained by the terminal device may include signal strength information, and the dynamic description information may be defined as, when the signal strength is too low, displaying an image representing that the signal is too low to dial in the dynamic dial icon.

As for a SMS (short message) icon, the icon data information obtained by the terminal device may include unread SMS information, and the dynamic description information may be defined as, when there is unread SMS, an image which indicates the number of unread SMS in the dynamic SMS icon.

S105 provides displaying the dynamic icon.

In an embodiment of the present disclosure, the terminal device displays the generated dynamic icon. During displaying the dynamic icon, the terminal device may refresh the dynamic icon based on the icon refresh rate information. In other words, the refresh rate for each dynamic icon displayed on the screen of the terminal device is determined by the refresh rate information of the respective dynamic icon.

In an embodiment of the present disclosure, after displaying the dynamic icon, the terminal device may detect whether the dynamic icon is within a current display region. When the dynamic icon is within the current display region, the terminal device refreshes the dynamic icon based on the refresh rate and displays the refreshed dynamic icon. In the case that the terminal device displays icons that are located at the home screen interface, if the user slides the screen to switch from one home screen interface to another so that some icons have sled out of the current display region, then the terminal device stops refreshing the icons that are not within the current display region. Furthermore, as for the icons not within the current display region, the terminal device will also stop generate dynamic icons corresponding to those icons, and only when the icons are returned back to the current display region, the terminal device will start generating and displaying the dynamic icon again.

In the method for displaying a dynamic icon of the present disclosure, it is possible to generate a dynamic icon corresponding to each application program based on the dynamic icon resource pack provided by the application program, so that the icon has a dynamic effect, and the dynamic icon may be displayed on the home screen interface of the operating system. Furthermore, since the dynamic icon is generated in real time, the waste of storage space due to storing a dynamic video icon file in advance is avoided, therefore, the system resources are stored. In addition, on the basis of the current display region, the generating, displaying, and refreshing of dynamic icon are limited to the icon(s) within the current display region, which further improves utilization efficiency of the system resources.

In the method for displaying a dynamic icon provided by the present disclosure, it is possible to not only dynamically display respective information of the application program, but also display individual dynamic effects for different application programs, so that the user can intuitively perceive more information about the application program without executing the application program.

Figure 2:
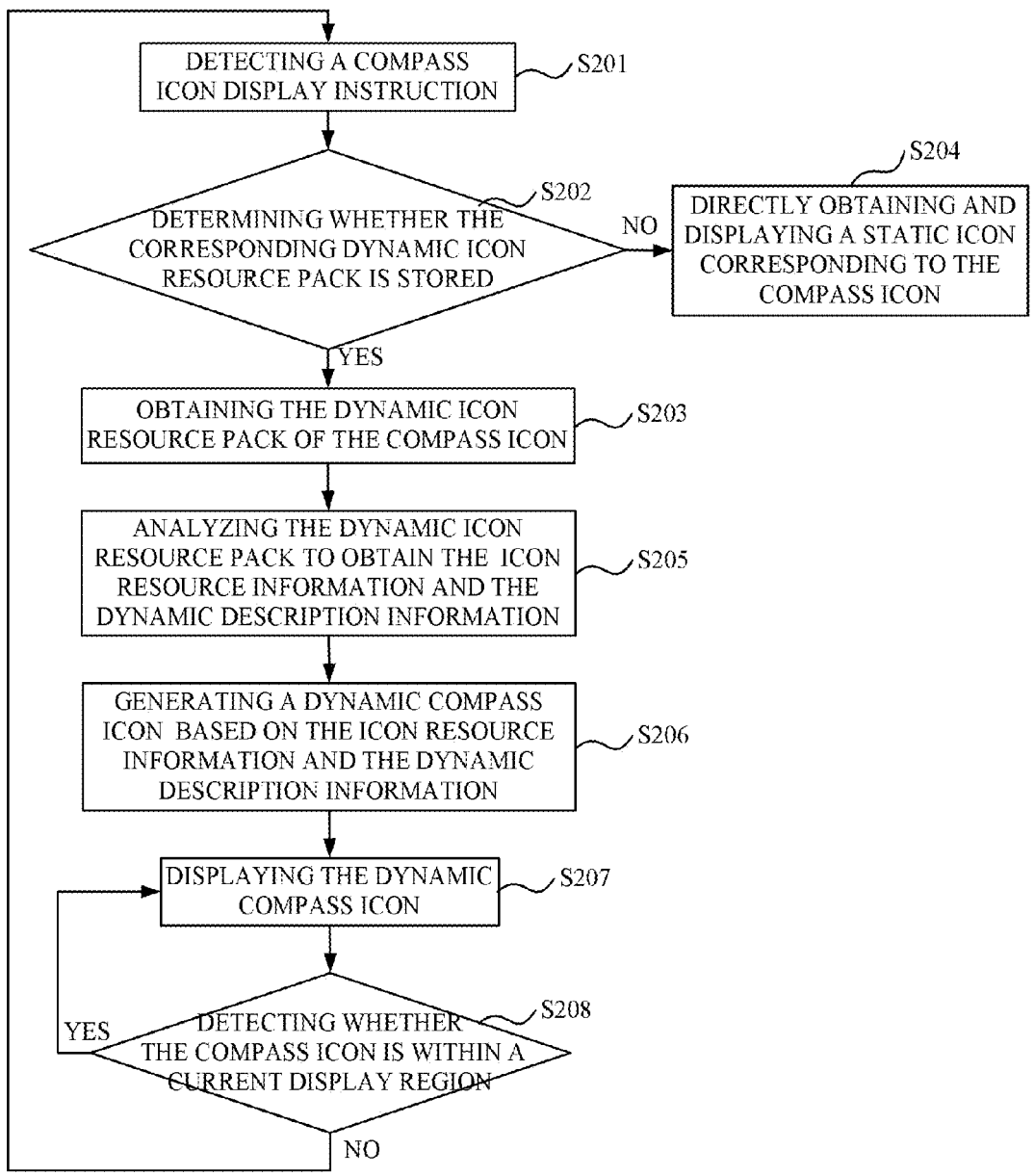
FIG. 2 is an illustrative flow chart of a method for displaying a dynamic compass icon provided by an embodiment of the present disclosure.

FIG. 2 is a flow chart of a method for displaying a dynamic compass icon provided by an embodiment of the present disclosure. As shown in FIG. 2, the method for displaying a dynamic compass icon includes the following steps.

S201 provides detecting a compass icon display instruction.

In an embodiment of the present disclosure, the terminal device detects a compass icon display instruction inputted by a user. In the present embodiment, the compass icon display instruction may be an instruction to display icons in the home screen user interface.

S202 provides determining whether the dynamic icon resource pack corresponding to the compass icon has been stored in the terminal device.

If the dynamic icon resource pack corresponding to the compass icon has been stored, the terminal device executes step S203, which is obtaining a dynamic icon resource pack of the compass icon; and if the dynamic icon resource pack corresponding to the compass icon has not been stored, the terminal device executes step S204, which includes directly obtaining and displaying a static icon corresponding to the compass icon.

S203 provides obtaining the dynamic icon resource pack of the compass icon.

In an embodiment of the present disclosure, after determining that the dynamic icon resource pack corresponding to the compass icon has been stored, the terminal device is required to obtain the dynamic icon resource pack corresponding to the compass icon, which should include icon resource information and dynamic description information.

S205 provides analyzing the dynamic icon resource pack to obtain the icon resource information and the dynamic description information.

In an embodiment of the present disclosure, after obtaining the dynamic icon resource pack of the compass icon, the terminal device analyzes the dynamic icon resource pack to obtain the icon resource information and the dynamic description information in the dynamic icon resource pack.

Figures 3A, 3B:
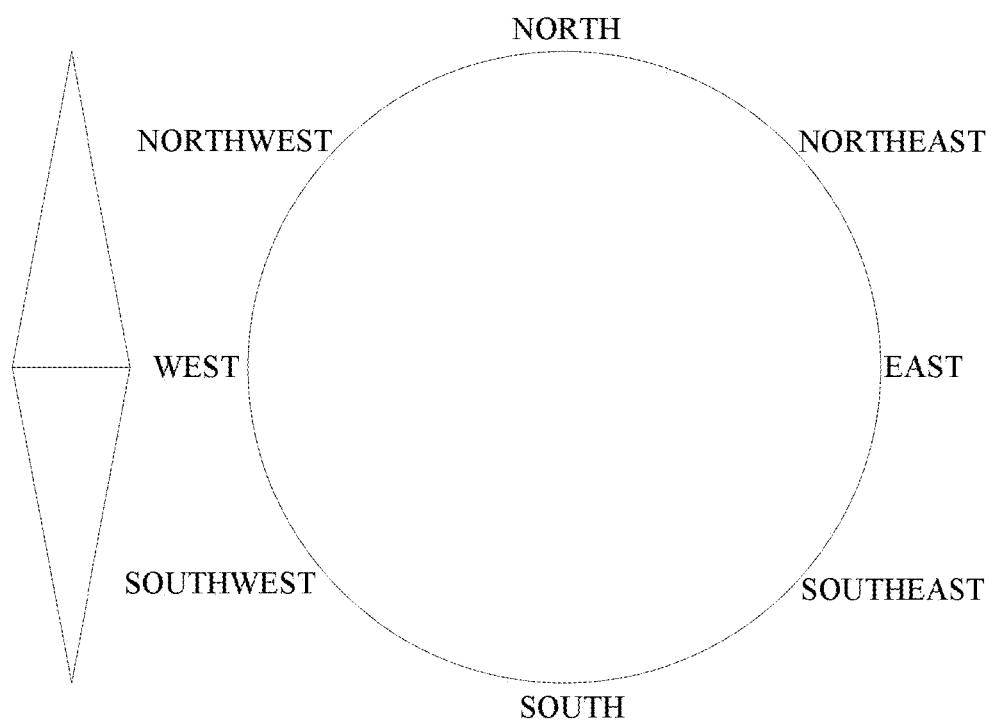
FIGS. 3A-3B are illustrative diagrams of a box compass picture and a needle picture of a compass icon provided by an embodiment of the present disclosure.

In an embodiment of the present disclosure, as shown in FIGS. 3A-3B, the icon resource information of the compass icon includes a box compass picture and a needle picture. The dynamic description information describes a display effect of the box compass picture and the needle picture by using a custom format, and obtains gyroscope sensor data and GPS data from the system. In an embodiment of the present disclosure, the dynamic description information may further include refresh rate information of the dynamic icon, and the refresh rate of the compass icon may be 10 frames per second.

S206 provides generating a dynamic compass icon based on the icon resource information and the dynamic description information.

In an embodiment of the present disclosure, the terminal device adjusts the box compass picture and the needle picture based on the obtained gyroscope sensor data, GPS data and dynamic description information, so as to generate a dynamic compass icon in real time.

S207 provides displaying the dynamic compass icon.

Figure 4A:
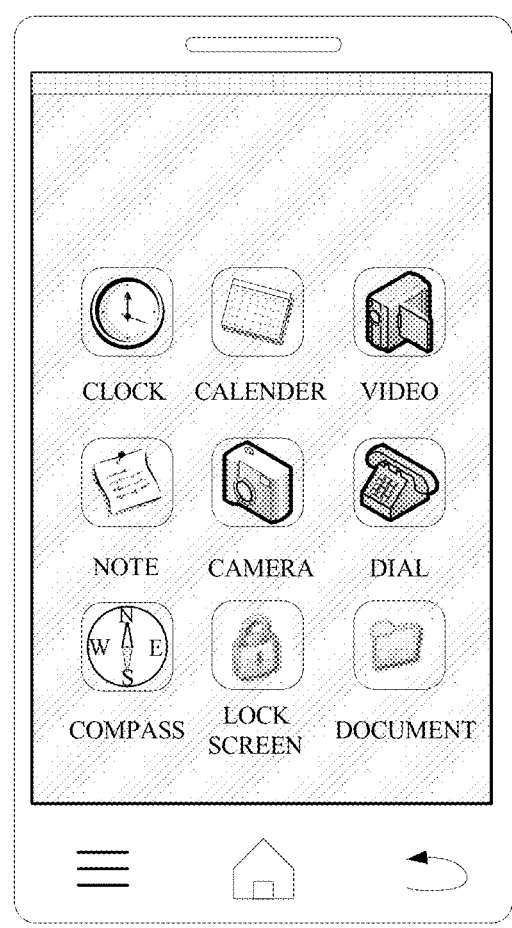
FIGS. 4A-4B are illustrative diagrams of a dynamic compass icon provided by an embodiment of the present disclosure.
Figure 4B:

In an embodiment of the present disclosure, the terminal device displays the generated dynamic compass icon. FIGS. 4A-4B are diagrams of the dynamic compass icon provided by an embodiment of the present disclosure. As shown in FIG. 4A, when the home screen interface of the terminal device displays a compass icon, the compass icon may display the current cardinal direction in real time. When the terminal device changes direction, as shown in FIG. 4B, the compass icon may adjust to display the correct current cardinal direction in real time.

S208 provides detecting whether the compass icon is within a current display region.

When the compass icon is within the current display region, the terminal device refreshes the compass icon based on the refresh rate and displays the refreshed compass icon. When the compass icon is out of the current display region, the terminal device stops refreshing the compass icon. When the compass icon returns back to the current display region, the terminal device will generate and display the dynamic compass icon again.

In the method for displaying a dynamic compass icon provided by the present disclosure, it is possible to generate a dynamic compass icon based on a dynamic icon resource pack of a compass icon, and to directly display the dynamic compass icon on a home screen interface of an operating system. Furthermore, since the dynamic compass icon is generated in real time, the waste of storage space due to storing an animation video icon in advance is avoided, therefore, the system resources are stored. In addition, on the basis of the current display region, the generating, displaying, and refreshing of the compass icon are limited to when the compass icon is within the current display region, which further improves utilization efficiency of the system resources.

In the method for displaying a dynamic compass icon provided by the present disclosure, the user can intuitively see the current direction information on the home screen interface without executing the compass application program.

Figure 5A:
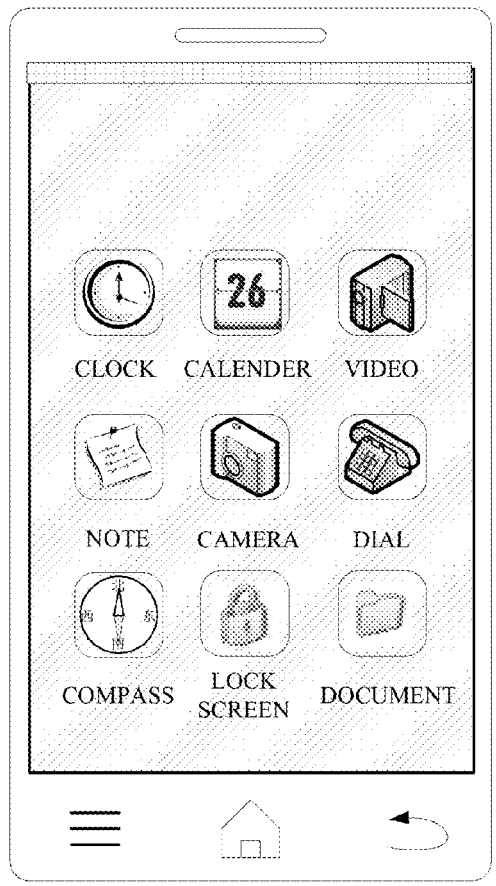
FIGS. 5A-5B are illustrative diagrams of a dynamic calendar icon provided by an embodiment of the present disclosure.
Figure 5B:
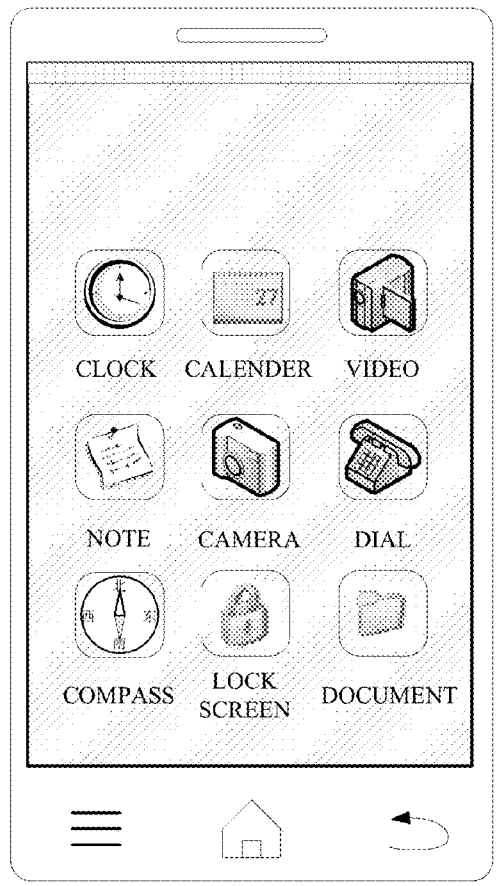

Furthermore, according to some embodiments of the present disclosure, at least one dynamic icon resource pack is available for one type of icon in the terminal device and each of the at least one dynamic icon resource pack may not only include different icon description information but also include different icon resource information. The user or the operating system of the terminal provider may upgrade the stored dynamic icon resource pack with a dynamic icon resource pack including different icon resource information from the stored dynamic icon resource pack. In this case, the terminal device automatically displays a dynamic icon based on the upgraded dynamic icon resource pack. FIGS. 5A-5B are diagrams of the dynamic calendar icon provided by an embodiment of the present disclosure. As shown in FIG. 5A, the calendar icon is displayed on the originally stored dynamic icon resource pack. When the terminal device obtains another dynamic icon resource pack when detecting a calendar icon display instruction, the calendar icon may have a totally different appearance as shown in FIG. 5B since the icon resource information of the upgraded dynamic icon resource pack is different from that of the originally stored dynamic icon resource pack.

Figure 6:
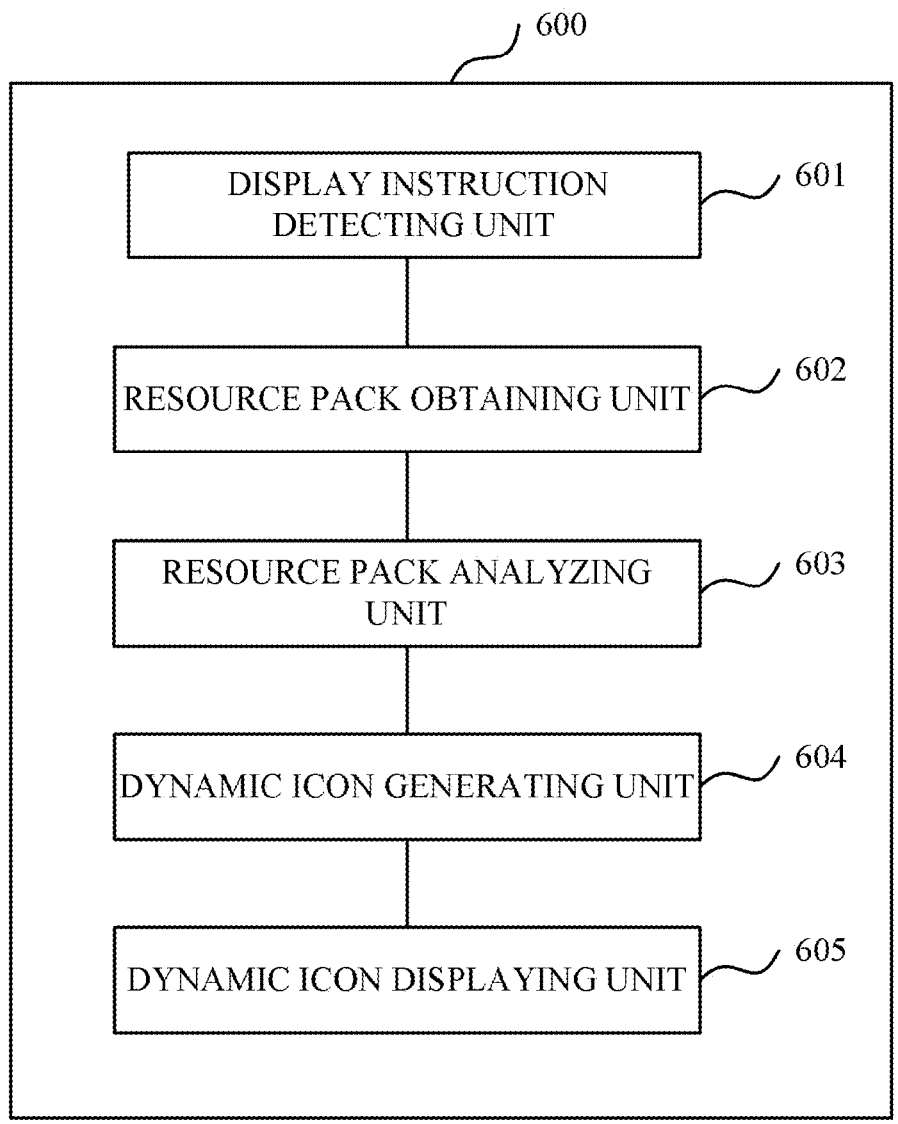
FIG. 6 is an illustrative block diagram of an apparatus for displaying a dynamic icon provided by an embodiment of the present disclosure.

FIG. 6 is a block diagram of an apparatus for displaying a dynamic icon provided by an embodiment of the present disclosure. As shown in FIG. 6, the apparatus for displaying a dynamic icon 600 includes the following components.

A display instruction detecting unit 601 configured to detect an icon display instruction, wherein the display instruction detecting unit 601 may be realized by one or more processors in the terminal device performing corresponding computer-executable instructions.

For example, the display instruction detecting unit 601 of a terminal device detects an icon display instruction inputted by a user. The icon display instruction may be an instruction to display icons in a home screen interface. For example, once the user unlocks a screen, the terminal device generally will display a home screen interface with a plurality of icons, and in this case, the instruction to unlock the screen inputted by the user is the icon display instruction. When the user inputs an instruction to exit an application program or close a current application program during execution of a certain application program, the terminal device will return to a home screen interface with a plurality of icons, and in this case, the instruction to exit the application program or close the current application program which is inputted by the user is the icon display instruction.

In other embodiments of the present disclosure, icons may be displayed on a interface of the operating system, such as a home screen interface. In addition, after execution of a certain application program, one or more icons may also be displayed on an interface provided by this application program. In this case, the instruction to execute the application program is also an icon display instruction.

A resource pack obtaining unit 602 configured to obtain a dynamic icon resource pack corresponding to the icon to be displayed based on the icon display instruction, wherein the resource pack obtaining unit 602 may be realized by one or more processors in the terminal device performing corresponding computer-executable instructions.

In an embodiment of the present disclosure, after detecting the icon display instruction inputted by the user, the terminal device is required to display a corresponding icon. When the display instruction detecting unit 601 detects an instruction for displaying the home screen interface inputted by the user, the terminal device is required to display a home screen background and a plurality of icons on the home screen interface. In this case, the resource pack obtaining unit 602 is required to obtain dynamic icon resource packs of all the icons to be displayed.

In an embodiment of the present disclosure, before the resource pack obtaining unit 602 obtains the dynamic icon resource packs corresponding to all of the icons to be displayed, the terminal device may firstly determine whether the dynamic icon resource packs corresponding to each icon to be displayed has been stored. If the dynamic icon resource pack corresponding to the icon to be displayed has been stored, the resource pack obtaining unit 602 obtains the dynamic icon resource pack corresponding to the icon to be displayed, and proceed to the subsequent step(s) based on the dynamic icon resource pack to generate a dynamic icon; and if there is no dynamic icon resource pack corresponding to the icon to be displayed, the terminal device directly obtains and displays a static icon corresponding to the icon to be displayed.

In an embodiment of the present disclosure, the format of the dynamic icon resource pack may be defined in advance, which at least includes icon resource information and dynamic description information.

A resource pack analyzing unit 603 configured to analyze the dynamic icon resource pack to obtain the icon resource information and the dynamic description information, wherein the resource pack analyzing unit 603 may be realized by one or more processors in the terminal device performing corresponding computer-executable instructions.

In an embodiment of the present disclosure, after the resource pack obtaining unit 602 obtains the dynamic icon resource pack corresponding to the icon to be displayed, the resource pack analyzing unit 603 analyzes the dynamic icon resource pack to obtain the icon resource information and the dynamic description information in the dynamic icon resource pack. The dynamic icon resource pack may be provided by the developer of the application program, and when the user installs the application program, the dynamic icon resource pack of the application program is stored in the terminal device at the same time.

In an embodiment of the present disclosure, the icon resource information refers to various resource files (a picture file, a text file, and the like) and the location information thereof, which are necessary for displaying the icon. The dynamic description information describes display content and display effect of the icon resource information (picture, text, and the like) by using a custom format, for example, displays a picture, an animation, a text at a certain position, obtains application program information (e.g., date time, weather information) from the system, or obtains sensor data (e.g., compass) from the system. In an embodiment of the present disclosure, the dynamic icon resource pack does not include animation file(s) or video file(s) generated in advance.

A dynamic icon generating unit 604 configured to generate a dynamic icon based on the icon resource information and the dynamic description information, wherein the dynamic icon generating unit 604 may be realized by one or more processors in the terminal device performing corresponding computer-executable instructions.

In an embodiment of the present disclosure, the terminal device does not store the animation file or video file of the dynamic icon, but the dynamic icon generating unit 604 may generate the dynamic icon based on the analyzed icon resource information and dynamic description information in real time.

In an embodiment of the present disclosure, the dynamic description information may further include refresh rate information of the dynamic icon. The resource pack analyzing unit 603 may obtain the refresh rate information of the dynamic icon from the dynamic description information while obtaining the icon resource information and the dynamic description information by analyzing the dynamic icon resource pack, which facilitates the dynamic icon generating unit 604 to determine the refresh rate of generating the dynamic icon based on the refresh rate information of the dynamic icon.

In an embodiment of the present disclosure, icon data information of the dynamic icon may include a variety of information, such as system status information, sensor data information, and application program status information. The resource pack analyzing unit 603 may obtain such icon data information based on the dynamic description information, and the dynamic icon generating unit 604 processes the icon resource information and the icon data information based on the dynamic description information so as to generate a dynamic icon. In this way, the dynamic icon may not only have a dynamic effect, but also display various icon data information like current system status information, sensor data information, and application program status information by utilizing the dynamic effect. Herein, the system status information may include electricity quantity information, time information, signal strength information, and the like of the current terminal device; the sensor data information may include geographical position information, direction information, angular velocity information, acceleration information, and the like of the current terminal device; and the application program status information may include notification information of the application program, network notification information, and the like.

As for a calendar icon, the icon data information obtained by the resource pack analyzing unit 603 may include Gregorian calendar information and lunar calendar information, the icon refresh rate may be set to 1 frame per second, and the dynamic description information may be defined as the dynamic icon alternately displaying Gregorian calendar and lunar calendar. In this way, the dynamic icon generating unit 604 finally generates an effect of the dynamic icon such that the Gregorian calendar and the lunar calendar are alternately displayed every second. In other embodiments of the present disclosure, the icon data information may further include holiday information and lunar solar term information, and the final generated dynamic icon may also display holiday information and lunar solar term information alternately.

As for a compass icon, the icon data information obtained by the resource pack analyzing unit 603 may include sensor data information, the icon refresh rate may be set to 10 or 20 frames per second, and the dynamic description information may be defined as the compass icon displaying direction needle in real time. In this way, the user may directly know the current cardinal direction without executing the compass function.

As for a weather forecast icon, the icon data information obtained by the resource pack analyzing unit 603 may include weather forecast information sent from a network, the weather forecast information may include temperature information, humidity information, and the like, the icon refresh rate may be set to 1 frame per 6 seconds, and the dynamic description information may be defined as the weather forecast icon displaying an image background which indicates the current weather with alternately displaying information like current temperature and current humidity.

As for a dial icon, the icon data information obtained by the resource pack analyzing unit 603 may include signal strength information, and the dynamic description information may be defined as, when the signal strength is too low, displaying an image representing that the signal is too low to dial in the dynamic dial icon.

As for a SMS icon, the icon data information obtained by the resource pack analyzing unit 603 may include unread SMS information, and the dynamic description information may be defined as, when there is unread SMS, displaying an image in the dynamic SMS icon which indicates the number of unread SMS.

A dynamic icon displaying unit 605 configured to display the dynamic icon, wherein the dynamic icon displaying unit 605 may be realized by one or more processors in the terminal device performing corresponding computer-executable instructions.

In an embodiment of the present disclosure, the dynamic icon displaying unit 605 displays the generated dynamic icon. During displaying the dynamic icon, the dynamic icon displaying unit 605 may refresh the dynamic icon based on the icon refresh rate information. In other words, the refresh rate for each dynamic icon is determined by the refresh rate information of the respective dynamic icon.

In an embodiment of the present disclosure, after the dynamic icon displaying unit 605 displays the dynamic icon, the terminal device may detect whether the dynamic icon is within a current display region. When the dynamic icon is within the current display region, the dynamic icon displaying unit 605 refreshes the dynamic icon based on the refresh rate and displays the refreshed dynamic icon. In the case that the terminal device displays icons that are located at the home screen interface, if the user slides the screen to switch home screen interfaces so that some icons have sled out of the current display region, then the dynamic icon displaying unit 605 stops refreshing the icons that are not within the current display region. Furthermore, as for the icons not within the current display region, the dynamic icon generating unit 604 will also stop generate dynamic icons corresponding to those icons, and only when the icons are returned back to the current display region, the terminal device will start generating and displaying the dynamic icon again.

In the apparatus for displaying a dynamic icon provided by the present disclosure, it is possible to generate a dynamic icon corresponding to each application program based on the dynamic icon resource pack provided by the application program, so that the icon has a dynamic effect, and the dynamic icon may be displayed on the home screen interface of the operating system. Furthermore, since the dynamic icon is generated in real time, the waste of storage space due to storing a dynamic video icon file in advance is avoided, therefore, the system resources are stored. In addition, on the basis of the current display region, the generating, displaying, and refreshing of dynamic icon are limited to the icon(s) within the current display region, which further improves utilization efficiency of the system resources.

In the apparatus for displaying a dynamic icon provided by the present disclosure, it is possible to not only dynamically display respective information of the application program, but also display individual dynamic effects for different application programs, so that the user can intuitively perceive more information about the application program without executing the application program.

Figure 7:
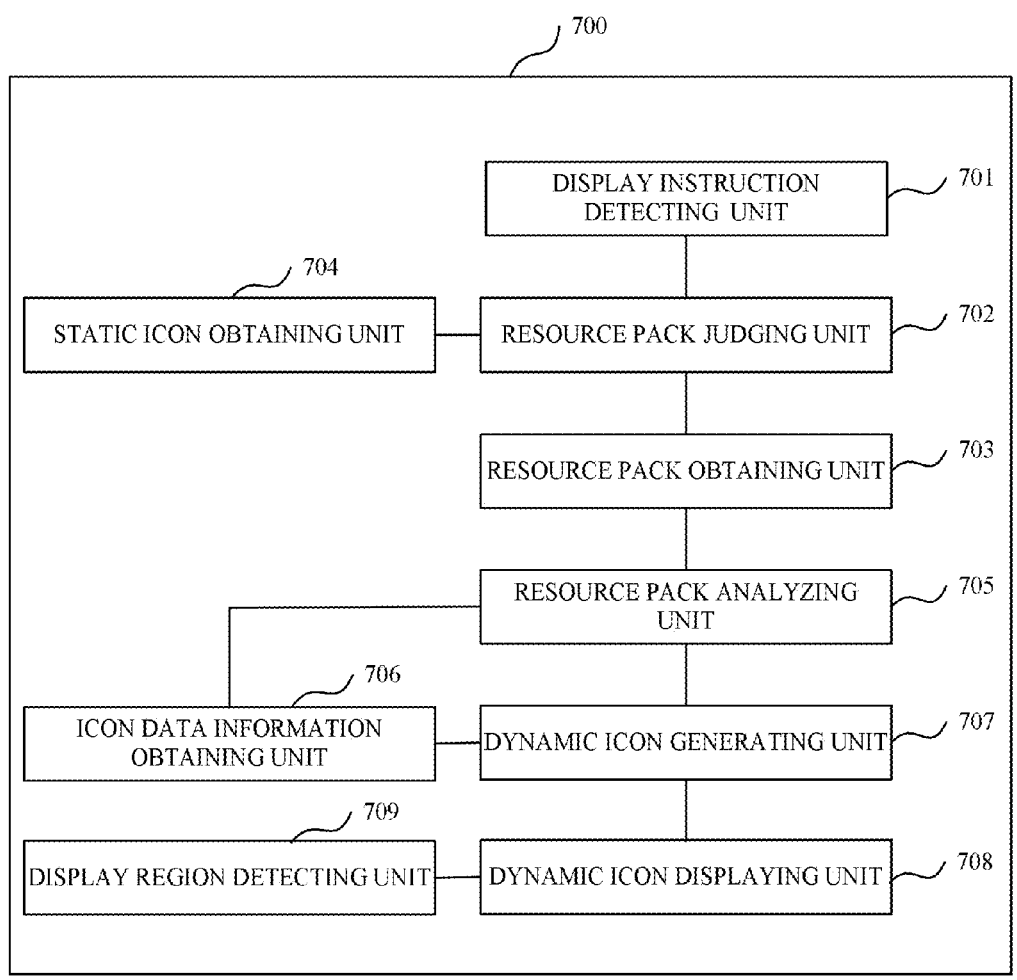
FIG. 7 is an illustrative block diagram of an apparatus for displaying a dynamic icon provided by an embodiment of the present disclosure.

FIG. 7 is a block diagram of an apparatus for displaying a dynamic icon provided by an embodiment of the present disclosure. As shown in FIG. 7, the apparatus for displaying a dynamic icon 700 includes the following components.

A display instruction detecting unit 701 configured to detect a compass icon display instruction, wherein the display instruction detecting unit 701 may be realized by one or more processors in the terminal device performing corresponding computer-executable instructions.

In an embodiment of the present disclosure, the display instruction detecting unit 701 detects a compass icon display instruction inputted by a user. In the present embodiment, the compass icon display instruction may be an instruction to display icons in the home screen interface.

A resource pack judging unit 702 configured to determine whether the dynamic icon resource pack corresponding to a compass icon has been stored, wherein the resource pack judging unit 702 may be realized by one or more processors in the terminal device performing corresponding computer-executable instructions.

If the dynamic icon resource pack corresponding to the compass icon has been stored, the resource pack obtaining unit 703 obtains a dynamic icon resource pack corresponding to the compass icon. If the dynamic icon resource pack corresponding to the compass icon has not been stored, a static icon obtaining unit 704 directly obtains and displays a static icon corresponding to the compass icon, wherein the static icon obtaining unit 704 may be realized by one or more processors in the terminal device performing corresponding computer-executable instructions.

A resource pack obtaining unit 703 configured to obtain the dynamic icon resource pack of the compass icon, wherein the resource pack obtaining unit 703 may be realized by one or more processors in the terminal device performing corresponding computer-executable instructions.

In an embodiment of the present disclosure, after the resource pack judging unit 702 determines that the dynamic icon resource pack corresponding to the compass icon has been stored, the resource pack obtaining unit 703 is required to obtain the dynamic icon resource pack corresponding to the compass icon, which should include icon resource information and dynamic description information.

A resource pack analyzing unit 705 configured to analyze the dynamic icon resource pack to obtain the icon resource information and the dynamic description information, wherein the resource pack analyzing unit 705 may be realized by one or more processors in the terminal device performing corresponding computer-executable instructions.

In an embodiment of the present disclosure, after the resource pack obtaining unit 703 obtains the dynamic icon resource pack of the compass icon, the resource pack analyzing unit 705 analyzes the dynamic icon resource pack to obtain the icon resource information and the dynamic description information in the dynamic icon resource pack.

In an embodiment of the present disclosure, as shown in FIGS. 3A-3B, the icon resource information of the compass icon includes a box compass picture and a needle picture. The dynamic description information describes a display effect of the box compass picture and the needle picture by using a custom format. In an embodiment of the present disclosure, the dynamic description information may further include refresh rate information of the dynamic icon, and the refresh rate of the compass icon may be 10 frames per second.

An icon data information obtaining unit 706 configured to obtain icon data information based on the dynamic description information, wherein the icon data information obtaining unit 706 may be realized by one or more processors in the terminal device performing corresponding computer-executable instructions.

In an embodiment of the present disclosure, the icon data information obtaining unit 706 obtains icon data information like gyroscope sensor data, GPS data and the like from the system.

A dynamic icon generating unit 707 configured to process the icon resource information and the icon data information based on the dynamic description information to generate a dynamic compass icon, wherein the dynamic icon generating unit 707 may be realized by one or more processors in the terminal device performing corresponding computer-executable instructions.

In an embodiment of the present disclosure, the dynamic icon generating unit 707 adjusts the box compass picture and the needle picture based on the gyroscope sensor data and GPS data obtained by the icon data information obtaining unit 706, as well as the dynamic description information analyzed by the resource pack analyzing unit 705, so as to generate the dynamic compass icon in real time.

A dynamic icon displaying unit 708 configured to display the dynamic compass icon, wherein the dynamic icon displaying unit 708 may be realized by one or more processors in the terminal device performing corresponding computer-executable instructions.

In an embodiment of the present disclosure, the dynamic icon displaying unit 708 displays the generated dynamic compass icon. FIGS. 4A-4B are diagrams of the dynamic compass icon provided by an embodiment of the present disclosure. As shown in FIG. 4A, when the home screen interface of the terminal device displays the compass icon, the compass icon may display the current cardinal direction in real time. When the terminal device changes direction, as shown in FIG. 4B, the compass icon may adjust to display the correct current cardinal direction in real time.

A display region detecting unit 709 configured to detect whether the compass icon is within a current display region, wherein the display region detecting unit 709 may be realized by one or more processors in the terminal device performing corresponding computer-executable instructions.

When the compass icon is within the current display region, the display region detecting unit 709 refreshes the compass icon based on the refresh rate and displays the refreshed compass icon. When the compass icon is out of the current display region, the display region detecting unit 709 stops refreshing the compass icon. When the compass icon returns back to the current display region, the terminal device will be generating and displaying the dynamic compass icon again.

In the apparatus for displaying a dynamic compass icon provided by the present disclosure, it is possible to generate a dynamic compass icon based on a dynamic icon resource pack of a compass icon, and to directly display the dynamic compass icon on a home screen interface of an operating system. Furthermore, since the dynamic compass icon is generated in real time, the waste of storage space due to storing an animation video icon in advance is avoided, therefore, the system resources are stored. In addition, on the basis of the current display region, the generating, displaying, and refreshing of the compass icon are limited to when the compass icon is within the current display region, which further improves utilization efficiency of the system resources.

In the apparatus for displaying a dynamic compass icon provided by the present disclosure, the user can intuitively perceive the current direction information on the home screen interface without executing the compass application program.

Those skilled in the art may appreciate that all or a part of steps in the above embodiments may be implemented by a hardware or may be implemented in a related hardware instructed by instructions stored in a non-transitory computer readable storage medium. The computer can also include the terminal device as defined in the present disclosure.

The non-transitory computer readable storage medium may use, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory of the terminal device.

The aforementioned methods can be implemented in a non-transitory computer readable storage medium recording computer-readable codes. The non-transitory computer readable storage medium includes all kinds of recording devices in which data readable by a computer system are stored. The non-transitory computer readable storage medium includes ROM, RAM, CD-ROM, magnetic tapes, floppy discs, optical data storage devices, and the like, as well as carrier-wave type implementations (e.g., transmission via Internet).

The intent, technical solution and advantageous effects of the present disclosure have been described in detail with reference to the above-mentioned specific embodiments. It should be appreciated that the above-mentioned embodiments are only specific implementations of the present disclosure, and do not intend to limit the protection scope of the present disclosure. Any modification, equivalent substitution, and improvement considered being within the intent and principle of the present disclosure, shall fall within the protection scope of the present disclosure.

What is claimed is:

1. A method for displaying a dynamic icon in a terminal device, comprising:
    detecting an icon display instruction, the icon display instruction being generated by an operating system that will automatically return to a home screen with a plurality of icons upon a multimedia player application finishing the playing of some multimedia contents;
    obtaining a dynamic icon resource pack corresponding to an icon to be displayed based on the icon display instruction, wherein the dynamic icon resource pack is originally stored in the terminal device and does not include animation files or video files generated in advance;
    analyzing the dynamic icon resource pack to obtain icon resource information and dynamic description information, the icon resource information comprising various resource files and the dynamic description information decribing display content and display effect of the icon resource information;

obtaining refresh rate information of the dynamic icon based on the dynamic description information;
obtaining icon data information based on the dynamic description information, wherein the icon data information comprises:
   system status information comprising electricity quantity information, time information and signal strength information;
   sensor data information comprising geographical position information, direction information and angular velocity information; and
   program status information comprising notification information and network notification information;
processing the icon resource information and the icon data information based on the dynamic description information;
generating a dynamic icon based on the icon resource information and the dynamic description information in real time; and
displaying the dynamic icon,
detecting whether the dynamic icon is within a current display region;
refreshing the dynamic icon if the dynamic icon is within the current display region; and
stopping refreshing the dynamic icon if the dynamic icon is not within the current display region;
wherein both the icon resource information and the dynamic description information are upgraded when a user downloads a new icon resource pack from Internet to substitute the originally stored dynamic icon resource pack.

2. The method according to claim 1, wherein before obtaining the dynamic icon resource pack corresponding to the icon to be displayed based on the icon display instruction, the method further comprises:
   determining whether the dynamic icon resource pack corresponding to the icon to be displayed has been stored in the terminal device; and
   obtaining the dynamic icon resource pack corresponding to the icon to be displayed based on the icon display instruction, if the dynamic icon resource pack corresponding to the icon to be displayed has been stored.

3. The method according to claim 2, wherein the method further comprises:
   displaying a static icon corresponding to the icon to be displayed instead of displaying the dynamic icon, if the dynamic icon resource pack corresponding to the icon to be displayed has not been stored.

4. The method according to claim 1, wherein the dynamic icon resource pack is defined with Extensible Markup Language (XML).

5. The method according to claim 1, wherein at least one dynamic icon resource pack is available for the terminal device and each of the at least one dynamic icon resource pack includes different icon resource information.

6. A terminal device for displaying a dynamic icon, comprising:
   a processor; and
   a memory for storing instructions executable by the processor,
   wherein the processor is configured to execute steps comprising:
      detecting an icon display instruction, the icon display instruction being generated by an operating system that will automatically return to a home screen with a plurality of icons upon a multimedia player application finishing the playing of some multimedia contents;
      obtaining a dynamic icon resource pack corresponding to an icon to be displayed based on the icon display instruction, wherein the dynamic icon resource pack is originally stored in the terminal device and does not include animation files or video files generated in advance;
      analyzing the dynamic icon resource pack to obtain icon resource information and dynamic description information, the icon resource information comprising various resource files and the dynamic description information decribing display content and display effect of the icon resource information;
      obtaining refresh rate information of the dynamic icon based on the dynamic description information;
      obtaining icon data information based on the dynamic description information, wherein the icon data information comprises:
         system status information comprising electricity quantity information, time information and signal strength information;
         sensor data information comprising geographical position information, direction information and angular velocity information; and
         program status information comprising notification information and network notification information;
      processing the icon resource information and the icon data information based on the dynamic description information;
      generating a dynamic icon based on the icon resource information and the dynamic description information in real time; and
      displaying the dynamic icon,
      detecting whether the dynamic icon is within a current display region;
      refreshing the dynamic icon if the dynamic icon is within the current display region; and
      stopping refreshing the dynamic icon if the dynamic icon is not within the current display region;
      wherein both the icon resource information and the dynamic description information are upgraded when a user downloads a new icon resource pack from Internet to substitute the originally stored dynamic icon resource pack.

7. The terminal device according to claim 6, wherein before obtaining the dynamic icon resource pack corresponding to the icon to be displayed based on the icon display instruction, the processor is further configured to execute steps comprising:
   determining whether the dynamic icon resource pack corresponding to the icon to be displayed has been stored in the terminal device; and
   obtaining the dynamic icon resource pack corresponding to the icon to be displayed based on the icon display instruction, if the dynamic icon resource pack corresponding to the icon to be displayed has been stored.

8. The terminal device according to claim 7, wherein the processor is further configured to execute steps comprising:
   displaying a static icon corresponding to the icon to be displayed instead of displaying the dynamic icon, if the dynamic icon resource pack corresponding to the icon to be displayed has not been stored.

9. The terminal device according to claim 6, wherein the dynamic icon resource pack is defined with Extensible Markup Language (XML).

10. The terminal device according to claim 6, wherein at least one dynamic icon resource pack is available for the terminal device and each of the at least one dynamic icon resource pack includes different icon resource information.

11. A non-transitory computer readable storage medium including instructions, executable by a processor in a terminal device, for performing a method comprising:
  detecting an icon display instruction, the icon display instruction being generated by an operating system that will automatically return to a home screen with a plurality of icons upon a multimedia player application finishing the playing of some multimedia contents;
  obtaining a dynamic icon resource pack corresponding to an icon to be displayed based on the icon display instruction, wherein the dynamic icon resource pack is originally stored in the terminal device and does not include animation files or video files generated in advance;
  analyzing the dynamic icon resource pack to obtain icon resource information and dynamic description information, the icon resource information comprising various resource files and the dynamic description information decribing display content and display effect of the icon resource information;
  obtaining refresh rate information of the dynamic icon based on the dynamic description information;
  obtaining icon data information based on the dynamic description information, wherein the icon data information comprises:
    system status information comprising electricity quantity information, time information and signal strength information;
    sensor data information comprising geographical position information, direction information and angular velocity information; and
    program status information comprising notification information and network notification information;
  processing the icon resource information and the icon data information based on the dynamic description information;
  generating a dynamic icon based on the icon resource information and the dynamic description information in real time; and
  displaying the dynamic icon,
  detecting whether the dynamic icon is within a current display region;
  refreshing the dynamic icon if the dynamic icon is within the current display region; and
  stopping refreshing the dynamic icon if the dynamic icon is not within the current display region;
  wherein both the icon resource information and the dynamic description information are upgraded when a user downloads a new icon resource pack from Internet to substitute the originally stored dynamic icon resource pack.

* * * * *